United States Patent [19]

Eydt

[11] Patent Number: 4,686,423

[45] Date of Patent: Aug. 11, 1987

[54] AUTOMOTIVE HEADLIGHT CONTROL

[75] Inventor: Christopher A. Eydt, Hamilton, Canada

[73] Assignee: Safety Solutions Co. Inc., Hamilton, Canada

[21] Appl. No.: 833,089

[22] Filed: Feb. 26, 1986

[51] Int. Cl.$^4$ .................................. B60Q 1/02
[52] U.S. Cl. ................................ 315/82; 315/80; 315/77; 315/307; 307/10 LS
[58] Field of Search .............. 315/82, 80, 77, 307; 307/10 LS, 157

[56] References Cited

U.S. PATENT DOCUMENTS

| | | |
|---|---|---|
| 4,357,558 | 11/1982 | Massoni et al. .................. 315/77 |
| 4,376,909 | 3/1983 | Tagami et al. ..................... 315/82 |
| 4,574,223 | 3/1986 | Pitel ................................... 315/307 |
| 4,577,117 | 3/1986 | Takeda et al. ................. 307/10 LS |
| 4,599,544 | 7/1986 | Martin ................................ 315/82 |
| 4,613,791 | 9/1986 | Kurihara et al. .................. 315/82 |

Primary Examiner—David K. Moore
Assistant Examiner—M. Nickerson
Attorney, Agent, or Firm—McConnell & Fox

[57] ABSTRACT

An automotive headlight control including means to detect when the automobile engine is operating and cause the headlights to be operated at reduced output. This ensures that when the vehicle is driven, the headlights automatically turn on and reduce the driving hazard.

5 Claims, 2 Drawing Figures

AUTOMOTIVE HEADLIGHT CONTROL

BACKGROUND OF THE INVENTION

Various studies have shown that the operation of automotive headlights during the daylight hours yield advantages in safety. Typical of such studies are those done for the United States Department of Transport, National Highways Traffic Safety Administration under various contracts such as Contract No. D.O.T. HS-9-02112 or the study done for the Insurance Institute for Highway Safety, Washington, D.C., dated May 1985 entitled "Fleet Experience with Daytime Running Lights in the United States". Also of interest is a paper presented to the Society of Automotive Engineers in February 1981 entitled "The Potential of Daytime Running Lights as a Vehicle Collision Counter-Measure".

All of these studies and many others clearly indicate that daytime running lights contribute substantially to reduction of daytime multiple vehicle accidents.

It is evident that the operation of the running lights can be assured by the vehicle operator who has merely to turn on the low beam headlights during operation, however, this solution is not ideal since it requires the intervention of the operator. It would be preferable that running lights operate automatically whenever the vehicle is operated and the engine is running.

PRIOR ART

The study referred to above made under Contract No. D.O.T. HS-9-02112 discloses a relay mode of operation which causes the low beam headlights to be operated whenever the ignition switch is in the "run" position. It does not otherwise interfere with the normal operation of the lamps. Some manufacturers have included front parking light modifications to provide daytime running lights in the original manufacture of the car. Others have proposed modification of the wiring to sense oil pressure, ignition switch position, brake pedal activations, etc. to activate the low beam headlights at full brightness.

All such modifications require complex connections to the automobile electrical system, connections in the driving compartment or other changes which are expensive or difficult for the car owner to complete. Further, when used to operate low beam headlights, the prior systems operate them at full brightness resulting in undue power consumption and possible glare.

SUMMARY OF THE INVENTION

The present invention relates to a simple modifying device which may be installed in vehicles already manufactured. This device, which may be installed in the engine compartment of the car with a minimum of electrical connections, does not require any disturbance of the electrical system nor penetration of the fire wall, but permits use of the headlights at reduced intensity as daytime running lights.

PREFERRED EMBODIMENT

Figure 1:
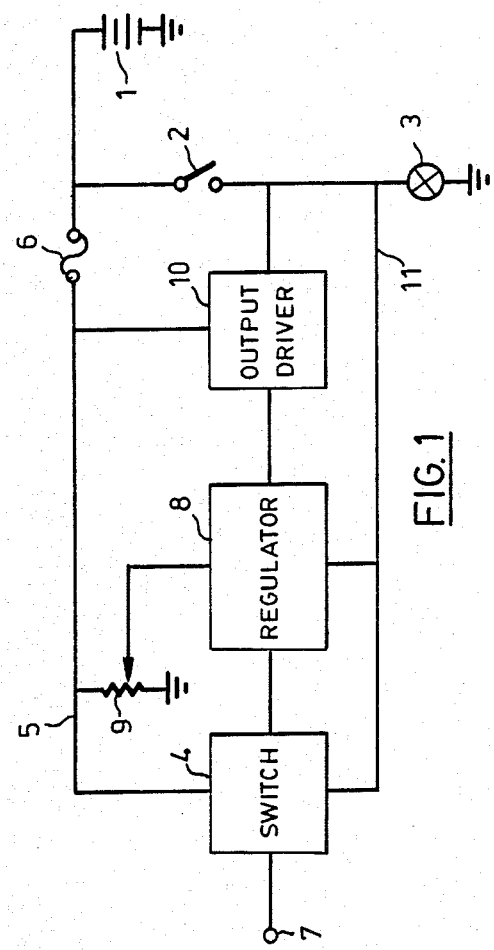
FIG. 1 is a block diagram useful in explaining the operation of the invention.

FIG. 1 illustrates a small portion of the electrical system of an automobile including a battery, which is the normal automobile battery, designated 1 connected through a switch 2 which operates the headlamps 3. Also connected to battery 1, but not shown, is a charging means, usually an alternator, driven by the automobile engine. This portion of the circuit is unmodified and is the standard automotive lighting circuit.

In accordance with the invention, a switch 4 is connected to the battery 1 through bus 5 and fuse 6. A reference potential is applied to switch 4 through terminal 7 and the output from switch 4 is applied to regulator 8. A selectable potential is derived from potentiometer 9 which is connected from bus 5 to ground and applied to regulator 8. The output from regulator 8 is applied to the output driver circuit 10 and the current from bus 5 flows through output driver circuit 10 to the lamps 3.

OPERATION

Switch 4 compares the potential on bus 5 with the reference on terminal 7. As long as the potential on bus 5 exceeds the potential on terminal 7 by a predetermined amount, switch is operated and produces an output which is applied to the regulator 8 to render it operative. When operative, regulator 8 produces an output which is proportional to the potential derived from potentiometer 9. This output when applied to the output driver circuit 10 controls the current flow from bus 5 through lamps 3 such that the potential drop across lamps 3 is equal to the potential developed by potentiometer 9. The feedback circuit along conductor 11 applies a potential to regulator 8 equal to the voltage drop across lamps 3 permitting regulator 8 to maintain this voltage drop equal to the potential from potentiometer 9. The feedback circuit conductor 11 also applies a potential to switch 4 to produce a degree of hysteresis in the operation of the switch to eliminate any possibility of "dither".

In order to appreciate the operation of this invention in a normal automobile, it should be understood that under normal operations the battery will maintain a static potential of approximately 12 volts, however, when the engine is operating and the battery is being charged by the charging means, the potential of bus 5 rises above the static potential of the battery. By proper selection of the reference potential applied to terminal 7, switch 4 can be made to operate only when the battery is being charged. In other words, switch 4 detects whether the engine is operating or not and is switched only when the engine is operating at sufficient speed to cause battery charging. If the engine is operating at a speed sufficient to raise the potential of bus 5 and operate switch 4, the regulator becomes operative.

By adjusting the potentiometer 9 the output from output driver circuit 10 can be adjusted and hence the intensity of lamps 3 can be adjusted. It has been found that running lamps operating the low beam lamp at as little as one-quarter of normal intensity produce satisfactory results and, as a result, potentiometer 9 can be adjusted to produce suitably reduced intensity from lamps 3. If the operator wishes to operate the lamps in their normal mode, that is by manual control, closing switch 2 will apply full potential to lamps 3 producing full intensity. Under these circumstances no output is applied from output driver circuit 10 since the potential supplied by output driver circuit 10 is less than the full battery voltage.

Figure 2:
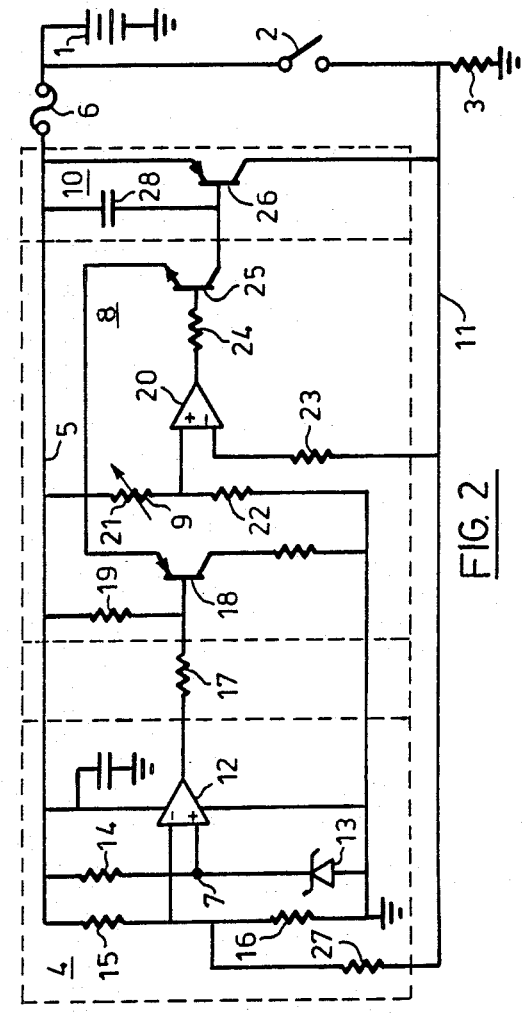
FIG. 2 is a schematic diagram of one embodiment of the invention showing in detail the components within the various blocks of FIG. 1.

Turning now to FIG. 2, it will be seen that switch 4 comprises an operational amplifier 12. The reference potential on terminal 7 is derived from the junction of resistor 14 and zener diode 13 which are connected between bus 5 and ground. The other terminal of the operational amplifier 12, that is the inverting terminal, is connected to the junction of resistors 15 and 16 which are connected between the bus 5 and ground and therefore apply to the inverting terminal a certain proportion of the potential on bus 5. The output of operational amplifier 12 is connected through resistors 17 and 19 to bus 5 and the junction of resistors 17 and 19 is connected to the base of transistor 18.

As will be seen, regulator 8 includes the operational amplifier 20. The non-inverting terminal of the operational amplifier is connected to potentiometer 9 which consists of variable resistor 21 and resistor 22 which are connected between bus 5 and ground.

The inverting terminal of operational amplifier 20 is connected through resistor 23 to the feedback bus 11. The output of operational amplifier 20 is applied through resistor 24 to the base of transistor 25. The emitter of transistor 25 is connected to the emitter of transistor 18. The collector on transistor 25 is connected to the base of transistor 26.

It will be seen that the output driver circuit consists primarily of transistor 26. The emitter of resistor 26 is connected to bus 5 and the collector is connected directly to the load 3 which is the lamps.

With zener 13 selected to produce 6.2 volts at the non-inverting input of operational amplifier 12, there is an output from the operational amplifier until the inverting input exceeds 6½ volts. Resistor 27 provides a feedback from the feedback bus 11 so that when the headlamps 3 are turned on by the control, the output from the operational amplifier 12 remains low until the input to the inverting terminal falls definitely below the normal potential indicating that the battery is being charged. The base of transistor 18 is set at a potential determined by the potential on bus 5 and the values of resistors 17 and 19 and the condition of operational amplifier 12 and is arranged to cause saturation of transistor 18 when the output from the operational amplifier is low.

The current through transistor 25 is controlled by its base voltage. As will be seen, the base voltage is determined by the output from operational amplifier 20. Potentiometer 9 is set so that the potential is approximately 80% of the voltage on bus 5 and this is applied to the non-inverting terminal of operational amplifier 20. The inverting terminal of operational amplifier 20 is connected through resistor 23 to the feedback bus 11 and thus the voltage on load 3. In other words, operational amplifier 20 compares the voltage on the load to a desired voltage as set by potentiometer 9 and produces an output which in turn controls the base current of transistor 25. The current through transistor 25 is the same as the base current of transistor 26 and the circuit controls the current through transistor 26 to maintain the potential across the load 3 equal to the potential applied to the non-inverting terminal of operational amplifier 20.

It should be noted that if switch 2 is closed to provide manual operation of the headlamps, the potential on feedback bus 11 rise to full battery voltage and the operation of transistors 25 and 26 is cut off.

Capacitor 28 is provided to eliminate oscillations caused by feedback delay from the output load to the base of transistor 26.

While no details have been given as to the exact value of the various components of the circuit, it will be understood that they must be selected in accordance with the characteristics of the system including battery voltage, charging voltage, operation characteristics of the operational amplifiers and transistors, however, the various values will be obvious to those skilled in the art.

It will be noted that the circuit as described provides linear control of the load, that is the current through transistor 26 is modulated so as to produce the desired voltage drop across the load 3 and the remaining voltage is dissipated in transistor 26. It will be evident that alternative modes of operation may be provided. It is well known, for example, to operate transistors in the switching mode to minimize the power dissipation within the transistor. It is therefore evident that transistor 26 could be operated in a switching mode rather than the linear mode and the output applied to load 3 could consist of a series of pulses of constant amplitude having varying frequency or width determined by the regulator. It would then be necessary to convert the linear output from the regulator into a pulse width modulated or pulse frequency modulated signal to be applied to the base of resistor 26. While such a mode of operation may be suitable for some applications, it will not be described in detail since it has certain disadvantages such as undesirable electromagnetic radiation. However, if desirable, such an arrangement could be used in a manner well understood by those skilled in the art. It will also be understood that while the preferred embodiment utilizes certain elements to perform the functions, many variations of these elements can be conceived which will provide the same functions as those defined in FIG. 1 and fall within the scope of this invention.

It will also be obvious that while the invention has been described in association with the use of the low beam headlamps of the automobile, it in fact applies to any daytime running light for automotive use where it is desired to operate the light at reduced output only when the vehicle is operating under daylight conditions.

It will be evident that the invention provides a modification device which may be readily installed in the engine compartment of an automobile without modifying the original wiring and by completing only three connections; one to ground, one to the positive battery terminal and one to the headlamp supply line.

I claim:

1. An automotive headlight control system for an automobile having an engine, a battery, charging means for said battery driven by the said engine, headlights operated from a terminal of said battery said control system including a switch responsive to a comparison of the voltage at the automobile said battery terminal to a reference voltage, a regulator having a selectable output which output is controlled by said switch, a current control device for supplying current to said headlights of the automobile from said battery terminal, said current control device being controlled in turn by the said output of said regulator whereby a controlled current is supplied to said headlights whenever said switch detects a voltage above a predetermined value at said automobile battery terminal.

2. A control system as claimed in claim 1 wherein said headlights have a normal output when directly connected to said battery terminal and said regulator causes the controlled current applied to said headlights to be controlled such that the output of said headlights in less than said normal output.

3. A control system as claimed in claim 2 wherein said regulator compares the voltage across the headlights to a reference voltage less than the voltage required to produce said normal output.

4. An automobile headlight control system for an automobile having a battery, headlights and charging means for said battery including:
   (a) means to compare the voltage at said automobile battery to reference voltage and produce a first output when said voltage at said battery exceeds said reference voltage;
   (b) means to supply a controlled current to said headlights producing a voltage across said headlights;
   (c) means to compare said voltage across the said automobile headlights with a reference voltage and produce a second output;
   (d) means to supply a controlled current to said headlights from said battery in accordance with said second output whenever said first output is present and the voltage across said automobile headlights is less than the voltage at said battery.

5. An automobile headlight control system for an automobile having an electrical system including, a battery, charging means and headlights supplied from a terminal of said battery, including:
   (a) first means, including a comparator and a reference voltage source providing a reference voltage greater than the static voltage of said battery but less than the normal voltage of said charging means, means to apply said reference voltage and the terminal voltage at the battery to said comparator to determine when said charging means is charging said battery and produce a control signal whereby said control signal is produced by said comparator when the terminal voltage at the battery exceeds said reference voltage;
   (b) second means to apply a controlled current to said headlights whenever said control signal is present, said controlled current being less than the current which would flow through said headlights if connected directly to said terminal of said battery.

* * * * *